July 8, 1941.　　　L. E. PEDERSEN　　　2,248,381

IRRIGATION VALVE

Filed Dec. 18, 1939

INVENTOR.
*L. E. Pedersen*

BY
ATTORNEYS.

Patented July 8, 1941

2,248,381

UNITED STATES PATENT OFFICE 2,248,381

IRRIGATION VALVE

Ludwig E. Pedersen, Hughson, Calif.

Application December 18, 1939, Serial No. 309,813

1 Claim. (Cl. 251—43)

This invention relates generally to an improved irrigation valve, and in particular the invention is directed to an improved irrigation valve of the disc type such as is adapted to be mounted on the upper or discharge end of an irrigation standpipe.

The principal objects of the present invention are to provide an irrigation valve of the type described, arranged so that the disc valve can be manipulated from an accessible point a substantial distance above the valve; and to provide a disc type irrigation valve wherein the discharge opening through the valve seat is unrestricted and fully open relative to the internal diameter of the standpipe.

Another object of the invention is to provide an irrigation valve of the type described, which is easy to mount on the upper end of an irrigation standpipe.

It is also an object of the invention to provide the irrigation valve with a disc valve guided in a manner to prevent rocking or side movement thereof under the water pressure, and eliminating the need of a stem guide-spider below the valve, which in ordinary valves tends to become clogged.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
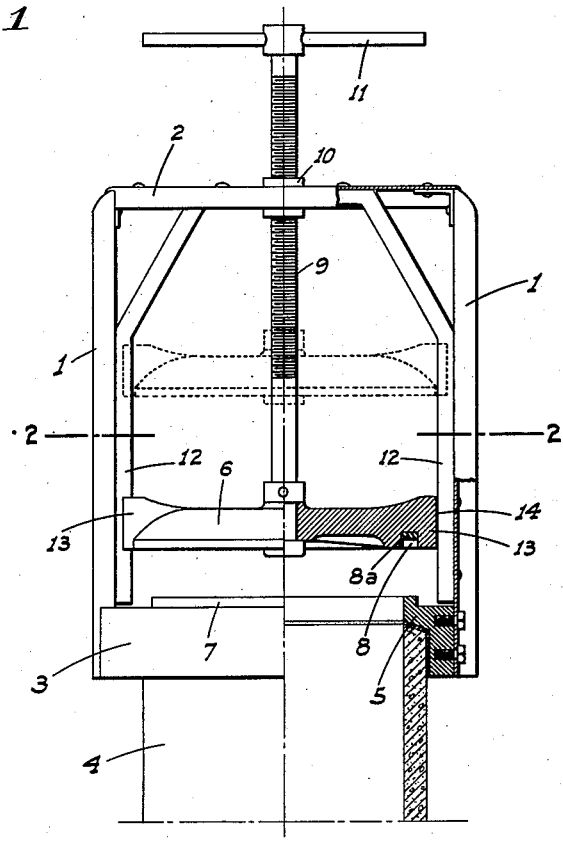
Figure 1 is a side elevation, partly in section, of the improved irrigation valve as mounted on a standpipe.
Figure 2:
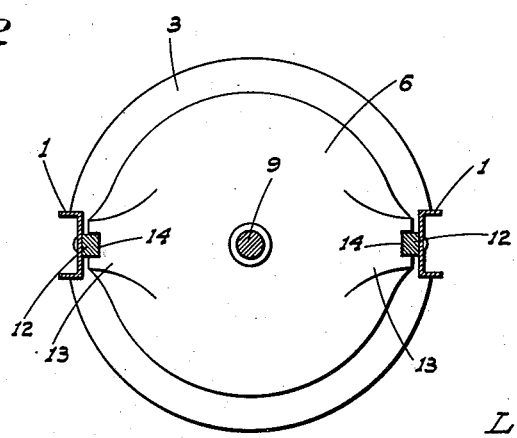
Figure 2 is a cross-section on line 2—2 of Fig. 1.

Referring now more particularly to the characters of reference on the drawing, the device comprises an inverted U-shaped frame or rigid construction adapted to be disposed vertically; said frame including vertical side members 1 and a horizontal top or cross member 2.

The side members are secured at their lower ends at opposed points on the periphery of a ring-like base 3 of such internal diameter to snugly engage about the end portion of a cylindrical standpipe 4. Adjacent its upper end, the base is formed with an annular flange 5 which extends radially inward above and rests upon the upper end of the standpipe 4 whereby to limit downward movement of base 3. The flange 5 extends radially inward a distance substantially equal to the thickness of the walls of the standpipe; the inner edge of said flange and the interior of the standpipe being substantially flush.

A disc valve 6 is disposed above base 3 and arranged as will hereinafter appear in detail for movement to and from said base; the base having a concentric, upstanding valve seat 7 formed thereon about the opening therein, while the adjacent face of the disc valve 6 is formed with an annular groove 8 for the reception of said valve seat. A sealing gasket 8a of suitable material may be disposed in the bottom of said groove.

The disc valve 6 is carried on the lower end of a screw stem 9, said end of the stem being rotatable but axially immovable relative to the disc valve. This stem is threaded for substantially its full length, and is threaded through a sleeve 10 fixed on cross member 2. An operating handle or control wheel 11 is secured on the upper end of the screw stem.

Vertical guide bars 12 are mounted on the adjacent or inner faces of side members 1, and extend from the base 3 upward a substantial distance and thence extend in converging relation to connection with the top member 2. The disc valve at opposed points in the periphery thereof is formed with integral radial projections 13 of substantial height; such projections having vertical grooves 14 therein and in which guide bars 12 engage.

In use, the base 3 of the device is engaged over the upper end portion of a standpipe and with flange 5 overhanging and resting on the upper end thereof. Any suitable sealing material, such as cement, may be placed between the pipe and base to secure the same together.

The screw stem 9 is normally run down until the disc valve 6 has engaged the base 3; the annular valve seat 7 being engaged in the corresponding groove 8 in the adjacent face of said disc valve.

To open the valve, the operator rotates control wheel 11 in a direction to run up screw stem 9 and lift disc valve 6 from base 3 and valve seat 7 the desired distance; the water then flowing therebetween and escaping from the standpipe in regulated quantity.

As the disc valve is supported and regulated entirely from above, there is no obstruction beneath said disc valve or in the opening in the base to obstruct the free flow of water from the standpipe, nor can the disc valve tilt under the influence of the water pressure. This is a distinct improvement over the now commonly used irrigation valve of the disc type wherein the base includes a spider across the opening therein, and a short screw stem threaded through the hub of the spider and supporting the disc valve. Such spider and stem not only provide an obstruction of the free flow from the standpipe, but also often accumulate weeds, etc., which prevent full closing of the valve.

Another advantage of the herein described valve is that it can be operated from a point entirely above the water level which may exist about the standpipe, whereas with the type valve now in use, the operator often has to work in the water as there is no stem upstanding from the disc valve.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

An irrigation valve comprising a ring-like base having a valve seat formed about the top, a U shaped frame secured on the base and including uprights and a top cross member, a disc valve disposed between the uprights to cooperate with the seat, an operating member supported and depending from the cross member and connected to the valve and guide bars secured on the inner face of the uprights, the valve having vertical grooves at the sides in which the bars ride and the bars, from a point some distance below the cross member, being bent to extend upwardly in converging relation to each other to connections with said cross member intermediate its ends.

LUDWIG E. PEDERSEN.